UNITED STATES PATENT OFFICE 2,216,515

PRODUCTION OF NITRO-MERCAPTO-DIPHENYLAMINES

Treat Baldwin Johnson, Bethany, Conn., assignor to Sharp & Dohme, Incorporated, Philadelphia, Pa., a corporation of Maryland No Drawing. Application September 11, 1937,
Serial No. 163,496

3 Claims. (Cl. 260—576)

This invention relates to mercapto diphenylamines and derivatives thereof, including the sodium salts, methyl thioethers, etc. It relates more particularly to a process by which mercapto diphenylamines are produced by the rearrangement of phenyl sulfenanilides; and it includes not only this new process, but certain intermediates, that is, new phenyl sulfenanilides advantageously used in the process, as well as new mercapto diphenylamines.

In its broader aspects, the process of the invention includes the rearrangement of compounds having an SNH linkage between aromatic nuclei, one nucleus of which has a nitro group in the ortho position relative to the SNH linkage, with the formation of mercapto diphenylamines, according to the type equation:

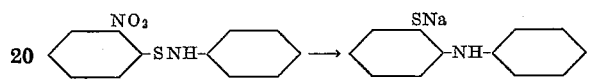

This rearrangement is effected by subjecting the sulfenanilides to the action of warm alkaline alcohol, as by heating alkaline alcoholic solutions of the sulfenanilides.

In general, substituents in either of the benzene nuclei of the sulfenanilides do not have any material effect or influence on the molecular rearrangement, except that one of the benzene nuclei should have a nitro group in the ortho position to the SNH linkage, and the other nucleus should have at least one of the ortho positions open, as the rearrangement is such as to form the ortho mercapto diphenyl amines. For example, if in carrying out the rearrangement, 2-nitrophenyl-sulfen-chloranilides be used the corresponding chlormercapto derivatives are obtained, while the 2-nitro-phenyl-sulfen-toluidides give corresponding methyl mercapto derivatives; in each of these instances, the chlorine or methyl substituent remains in the benzene nucleus to which the mercapto group is attached. On the other hand, 2,4-nitrochlorphenyl-sulfen-anilides yield corresponding chlornitrophenyl mercapto-phenyl amines.

From the standpoint of new intermediates, the invention includes the new nitrobenzene, sulfen-toluidides, which may be readily prepared by reacting a nitrobenzene sulfenyl chloride with a toluidine, usually in the presence of a solvent such as anhydrous ether. This production of the new intermediates will be illustrated by the following example, showing the production of 2-nitrobenzene-sulfen-o-toluidine.

Example 1.—o-Nitrophenyl sulfenyl chloride is prepared by allowing gaseous chlorine to react with o,o'-dinitrodiphenyldisulfide in ice-cold chloroform. The sulfenyl chloride is then allowed to react with o-toluidine, 50 parts of the sulfenyl chloride dissolved in about 400 parts of anhydrous ether being reacted with 55 parts of o-toluidine dissolved in about 50 parts of ether, the toluidine solution being added slowly through a reflux condenser to the other solution. As the toluidine solution is added, o-toluidine hydrochloride separates and sufficient heat is generated so that the solution begins to reflux. After all of the toluidine solution is added, the mixture is allowed to stand for about thirty minutes, after which the toluidine hydrochloride is filtered out and washed with ether. The combined filtrates are then concentrated by slow evaporation of the ether and the 2-nitrobenzene-sulfen-o-toluidide is crystallized as an orange reddish solid, M. P. 119.5–120° C. It is soluble in ordinary organic solvents and insoluble in dilute hydrochloric acid.

Among the other new sulfen-toluidides which may be readily prepared in the same manner and which are included as new intermediates, are the 2-nitrobenzene-sulfen-p-toluidide, 2,4-nitrochlorbenzene-sulfen-o-toluidide and 2,4-nitrochlorbenzene-sulfen-p-toluidide.

For carrying out the process, however, with the production of mercapto diphenylamines, any of the 2-nitrobenzene-sulfen-anilides may be used, as the process is not restricted to the new intermediates, but includes the production of the mercapto derivatives from a wide range of sulfen compounds, including not only the toluidides above, but also the corresponding chloranilides, which are readily prepared by a process similar to that described in Example 1. The manipulative steps of the process are simple, as to effect the desired rearrangement it is merely necessary to heat, as by refluxing, an alkaline alcoholic solution of the 2-nitrobenzene-sulfen-anilide for the required period of time, usually in the neighborhood of three hours for complete rearrangement, and to subsequently purify the mercaptan obtained, as by isolating and purifying it as its sodium salt. The sodium salts so obtained are readily converted into the corresponding thioethers by reaction with alkyl iodides, such as methyl iodide.

By this process, a number of new products, which are included in the invention, may be readily produced. Among these new products are the 2-nitro-phenyl mercapto phenylamines of the formula

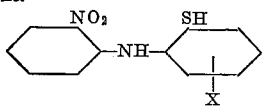

in which X is halogen or methyl or other substituent, as well as the corresponding compounds in which the benzene nucleus to which the nitro group is attached is further substituted by a halogen or other substituent, and the salts, such as the sodium salts, and thioethers of these compounds. The compounds in which X represents a methyl group or a halogen are readily produced from the 2-nitro-benzene-sulfen-chloranilides or toluidides, and corresponding higher or other derivatives may be readily prepared by substituting for the chloranilide group or the toluidide group another suitable anilide group.

The invention will be further illustrated by the following examples, but it is not limited thereto.

*Example 2.*—2,4 - nitrochlorphenyl - sulfen-o-chloranilide is prepared from 2,4-nitrochlorphenyl sulfenyl chloride by the procedure similar to that described in Example 1, using o-chloranilide. 5 parts of this sulfen-chloranilide are refluxed in 25 parts of alcohol containing 5 parts of 20% sodium hydroxide for about three hours. The reaction product is isolated and purified as the sodium salt. The sodium salt is converted into the corresponding methylthio ether, having the formula:

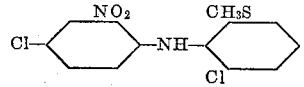

by refluxing in alcoholic solution with an excess of methyl iodide, after which the solution is diluted with water whereupon the thioether crystallizes out upon cooling. The methylthio ether is soluble in ether, alcohol and benzene, but is insoluble in water. It melts at 158–158.5° C. It is a new product.

Among other new diphenylamines which are readily prepared by this same process, using the corresponding sulfenanilides, are the following:

2-nitro-2'-methyl-6'-methylmercapto diphenylamine, M. P. 94° C.
2-nitro-4'-methyl-6'-methylmercapto diphenylamine, M. P. 84–5° C.
2-nitro-2'-chloro-6'-methylmercapto diphenylamine, M. P. 144.5–145° C.
2-nitro-4-chloro-6'-methylmercapto diphenylamine, M. P. 135–136° C.

and their corresponding salts and free mercaptans.

I claim:

1. The process of preparing mercapto diphenylamines which comprises rearranging a 2-nitrophenyl-sulfen-anilide by heating an alkaline alcoholic solution thereof.

2. The process of preparing methyl mercapto diphenylamines which comprises rearranging a 2-nitrophenyl-sulfen-toluidide by heating an alkaline alcoholic solution thereof.

3. The process of preparing chlorinated mercapto diphenylamines which comprises rearranging a 2-nitrophenyl-sulfen-chloranilide by heating an alkaline alcoholic solution thereof.

TREAT BALDWIN JOHNSON.